(12) United States Patent
Mori et al.

(10) Patent No.: US 8,000,966 B2
(45) Date of Patent: *Aug. 16, 2011

(54) METHODS AND APPARATUS FOR NATURAL SPOKEN LANGUAGE SPEECH RECOGNITION WITH WORD PREDICTION

(75) Inventors: Shinsuke Mori, Kawasakishi (JP); Masafumi Nishimura, Yokohama (JP); Nobuyasu Itoh, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 518 days.

This patent is subject to a terminal disclaimer.

(21) Appl. No.: 12/045,198

(22) Filed: Mar. 10, 2008

(65) Prior Publication Data

US 2008/0221872 A1 Sep. 11, 2008

Related U.S. Application Data

(62) Division of application No. 09/904,147, filed on Jul. 11, 2001, now Pat. No. 7,359,852.

(30) Foreign Application Priority Data

Jul. 11, 2000 (JP) ................................ 2000-210599

(51) Int. Cl.
*G10L 15/18* (2006.01)
(52) U.S. Cl. ................................ 704/257; 704/1; 704/9
(58) Field of Classification Search ............... 704/1, 9, 704/257
See application file for complete search history.

(56) References Cited

U.S. PATENT DOCUMENTS

| | | | |
|---|---|---|---|
| 5,293,584 A | 3/1994 | Brown et al. | |
| 5,457,768 A | 10/1995 | Tsuboi et al. | |
| 5,740,318 A | 4/1998 | Naito et al. | |
| 5,774,845 A | 6/1998 | Ando et al. | |
| 6,374,217 B1 | 4/2002 | Bellegarda | |
| 6,418,431 B1 | 7/2002 | Mahajan et al. | |
| 6,598,017 B1 | 7/2003 | Yamamoto et al. | |
| 6,782,357 B1 | 8/2004 | Goodman et al. | |
| 2003/0046073 A1 | 3/2003 | Mori et al. | |

OTHER PUBLICATIONS

No further references have been found beyond those listed on the IDS of Jul. 2, 2009.*
Dekai et al, An Information-Theoretic Empirical Analysis of Dependency-Based Feature Types for Word Prediction, 1999, EMNLPVLC-99, pp. 138-147.
Roland Kuhn, Speech Recognition and the Frequency of Recently Used Words: A Modified Markov Model for Natural Language, 1988, Proceedings of the 12th Conference on Computational Linguistics, vol. 1, pp. 348-350.
C. Chelba et al, Exploiting Syntactic Structure for Language Modeling, 1998, Proceedings of the Thirty-Sixth Annual Meeting of the Association for Computational Linguistics, pp. 225-231.
L. R. Bahl et al, "A Maximum Likelihood Approach to Continuous Speech Recognition," IEEE Trans. vol. PAMI-5, No. 2, Mar. 1983.
T. J. Schult, "Transparente Trivialitaten: Cyc-Wissensbasis in WWW", c't, 1996, vol. 10, pp. 118-121.

* cited by examiner

*Primary Examiner* — Talivaldis Ivars Smits
(74) *Attorney, Agent, or Firm* — Wolf, Greenfield & Sacks, P.C.

(57) ABSTRACT

A word prediction method and apparatus improves precision and accuracy. For the prediction of a sixth word "?", a partial analysis tree having a modification relationship with the sixth word is predicted. "sara-ni sho-senkyoku no" has two partial analysis trees, "sara-ni" and "sho-senkyoku no". It is predicted that "sara-ni" does not have a modification relationship with the sixth word, and that "sho-senkyoku no" does. Then, "donyu", which is the sixth word from "sho-senkyoku no", is predicted. In this example, since "sara-ni" is not useful information for the prediction of "donyu", it is preferable that "donyu" be predicted only by "sho-senkyoku no".

22 Claims, 10 Drawing Sheets

(B) PREDICTION THAT A PARTIAL ANALYSIS TREE WILL MODIFY THE NEXT WORD (C) PREDICTION OF THE NEXT WORD FOLLOWING THE PARTIAL ANALYSIS TREE

METHODS AND APPARATUS FOR NATURAL SPOKEN LANGUAGE SPEECH RECOGNITION WITH WORD PREDICTION

CROSS REFERENCE TO RELATED APPLICATIONS

This application is a divisional application of U.S. patent application Ser. No. 09/904,147, filed on Jul. 11, 2001 now U.S. Pat. No. 7,359,852, which claims priority from Japanese Patent Application No. 2000-210599, filed on Jul. 11, 2000, both of which are incorporated herein by reference in their entireties.

FIELD OF THE INVENTION

The present invention relates to a speech recognition apparatus and a method therefor, and in particular to a speech recognition apparatus for recognizing the natural language spoken by persons that thereafter is used for composing sentences and for creating text data and a method therefor.

BACKGROUND OF THE INVENTION

A statistical method for using an acoustic model and a language model for speech recognition is well known, and has been featured in such publications as: "A Maximum Likelihood Approach to Continuous Speech Recognition," L. R. Bahl, et. al., IEEE Trans. Vol. PAMI-5, No. 2, March, 1983; and "Word based approach to large-vocabulary continuous speech recognition for Japanese," Nishimura, et. al., Information Processing Institute Thesis, Vol. 40, No. 4, April, 1999.

According to an overview of this method, a word sequence W is voiced as a generated sentence and is processed by an acoustic processor, and from a signal that is produced a feature value X is extracted. Then, using the feature value X and the word sequence W, assumed optimal recognition results W' are output in accordance with the following equation to form a sentence. That is, a word sequence such that, when the word sequence W is voiced, the product of the appearance probability P (X|W), of the feature value (X), and the appearance probability (P(W)), of the word sequence W, is the maximum (argmax) and is selected as the recognition results W'.

$$W' = \underset{w}{\arg\max}\, P(W|X) \underset{w}{\arg\max}\, P(w)P(X|W) \quad \text{[Equation 1]}$$

where P(W) is for a language model, and P(W|X) is for an acoustic model.

In this equation, the acoustic model is employed to obtain the probability P(X|W), and words having a high probability are selected as a proposed word for recognition. This language model is frequently used to provide an approximation of the probability P(W).

For the conventional language model, normally, the closest word sequence is used as a history. An example is an N-gram model. With this method, an approximation of a complete sentence is produced by using the probability of the appearance of N sequential words, i.e., an approximation of the appearance probability of the word sequence W. This method is exemplified by the following established form.

$$P(w) = P(w_0)P(w_1|w_0)P(w_2|w_0w_1), \ldots, \quad \text{[Equation 2]}$$

$$P(w_n|w_0w_1, \ldots, w_{n-1})$$

$$= P(w_0)P(w_1|w_0)\prod_{i=2}^{n} P(w_i|w_{i-2}w_{i-1})$$

Assume that in the above equation the appearance probability of the next word W[n] is affected only by the immediately preceding N−1 words. For this purpose, various values can be used for N, but since N=3 is frequently employed because of the balance it provides between effectiveness and the learning data that is required, in this equation, N=3 is employed, and the above method is therefore called a tri-gram or a 3-gram method. Hereinafter, when the n-th word in a word sequence W consisting of n words is represented by W[n], the appearance probability condition for the calculation of the word W[n] is that there are N−1 preceding words (two words), i.e., the appearance probability for the word sequence W is calculated using P(W[n]|W[n−2]W[n−1]). In this equation, the statement to the left (W[n]) of "|" represents a word to be predicted (or recognized), and the statement to the right (W[n−2]W[n−1]) represents the first and the second preceding words required to establish the condition. This appearance probability P(W[n]|W[n−2]W[n−1]) is learned for each word W[n] by using text data that have previously been prepared and stored as part of a dictionary database. For example, for the probability that a "word" will appear at the beginning of a sentence, 0.0021 is stored, and for the probability a "search" will follow, 0.001 is stored.

Figure 8:
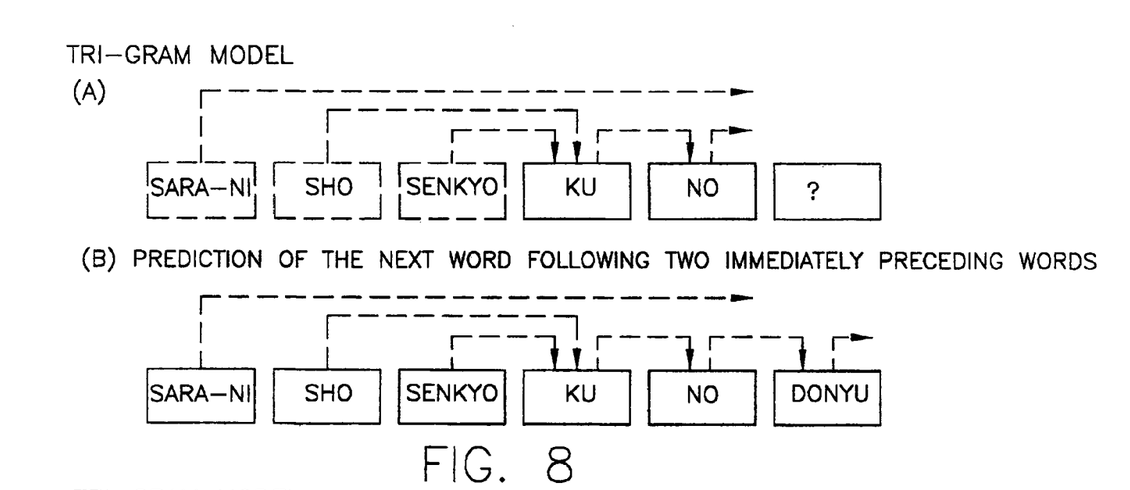
FIG. 8 is a diagram showing an example for explaining word prediction using a tri-gram model.

The Tri-gram model will now be described by using a simple phrase. This phrase is "sara-ni sho-senkyoku no (further, small electoral districts)" and is used to predict the following "donyu (are introduced)". FIG. 8A is a diagram showing the state before the prediction is fulfilled, and FIG. 8B is a diagram showing the state after the prediction is fulfilled. As is shown in FIG. 8A, the phrase consists of five words, "sara-ni", "sho", "senkyo", "ku" and "no", while the predicted word is represented by "?", and the arrows in FIGS. 8A and 8B are used to delineate the modifications applied to the words. As previously described, in the tri-gram model, two preceding words are constantly employed to predict a following word. Therefore, in this example, "donyu" is predicted by "ku" and "no", words enclosed by solid lines in FIG. 8A.

Figure 9:
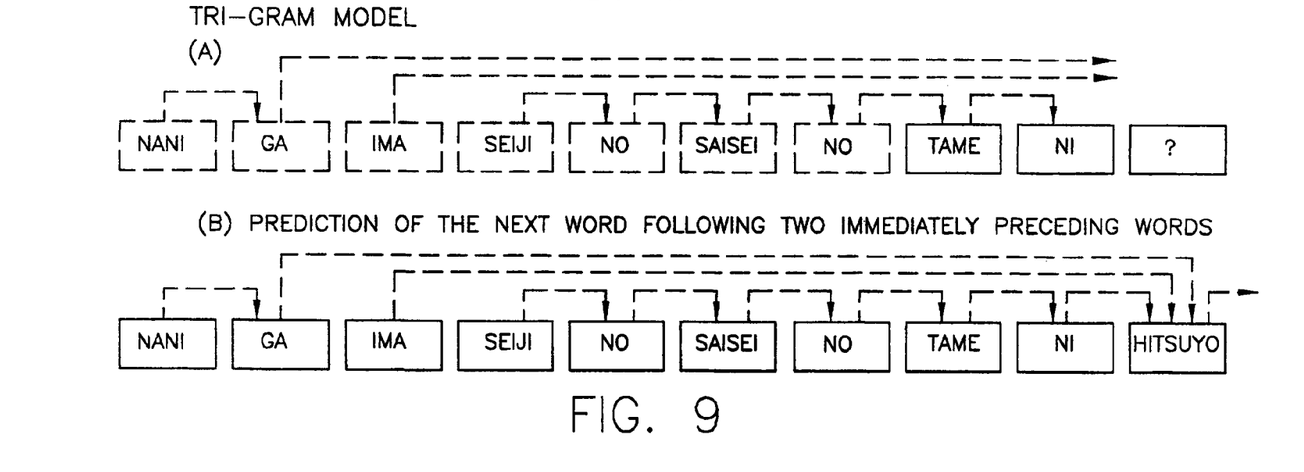
FIG. 9 is a diagram showing another example for explaining word prediction using a tri-gram model.

However, depending on the sentence structure, the tri-gram method for employing two immediate words to predict a following word is not the most appropriate. For example, the tri-gram method is not appropriate for the case illustrated in FIG. 9, wherein the phrase "nani-ga ima seiji-no saisei-no tame-ni (at present, for reconstruction of the politics, what)" is used to predict a word. According to the tri-gram method, as is shown in FIG. 9A, "tame" and "ni" are employed to predict "hitsuyo (is required)". But in addition to these words, other structurally related words, such as "nani" or "ima" must be taken into account in order to increase the accuracy of the prediction.

Chelba and Jelinek proposed a model for employing the head word of two immediately preceding partial analysis trees to predict a succeeding word. According to the Chelba & Jelinek model, the words are predicted in order, as they appear. Therefore, when the i-th word is to be predicted, the (i−1)th word and the structure are established. In this state, first, the head word of the two immediately preceding partial analysis trees are employed to predict, in the named order, the following word and its speech part. At this time, the modification relationship between the head word of the two immediately preceding partial analysis trees and the predicted word is not taken into account. After the word is predicted, the sentence structure that includes the word is updated. Therefore, the accuracy of the prediction can be improved compared with the tri-gram method, which employs two immediately preceding words to predict a following word. However, in the model proposed by Chelba and Jelinek, a word is predicted by referring to the head word of the two immediately preceding partial analysis trees, regardless of how the words are modified, so that, depending on the sentence structure, the accuracy of the prediction may be reduced. This will be explained by referring to the phrase "sara-ni sho-senkyoku no", used for the tri-gram model.

Figure 10:
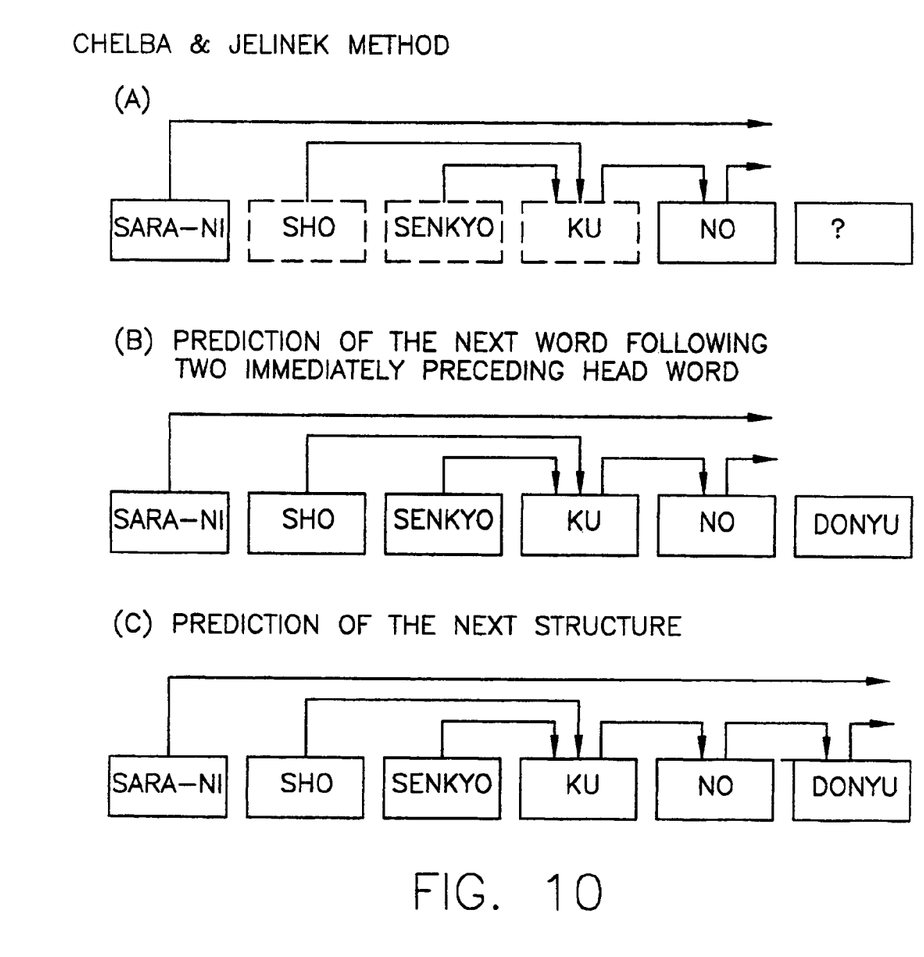
FIG. 10 is a diagram showing an example for explaining word prediction using the method proposed by Chelba and Jelinek.

As is shown in FIGS. 10A to 10C, the phrase "sara-ni sho-senkyoku no" is constituted by two partial analysis trees, and the head word of the trees are "sara-ni" and "no", which are enclosed by solid lines in FIG. 10A. Therefore, according to the method proposed by Chelba and Jelinek, "sara-ni" and "no", which are two immediately preceding head word as is shown in FIG. 10B, are employed to predict the next word "donyu". When "donyu" is predicted, as is shown in FIG. 10C, the sentence structure including "donyu" is predicted. In the prediction of the structure, the modification of words as indicted by arrows is included. Since "sara-ni" does not modify "donyu", it is not only useless for the prediction of the word "donyu", but also may tend to degrade the prediction accuracy.

Figure 11:
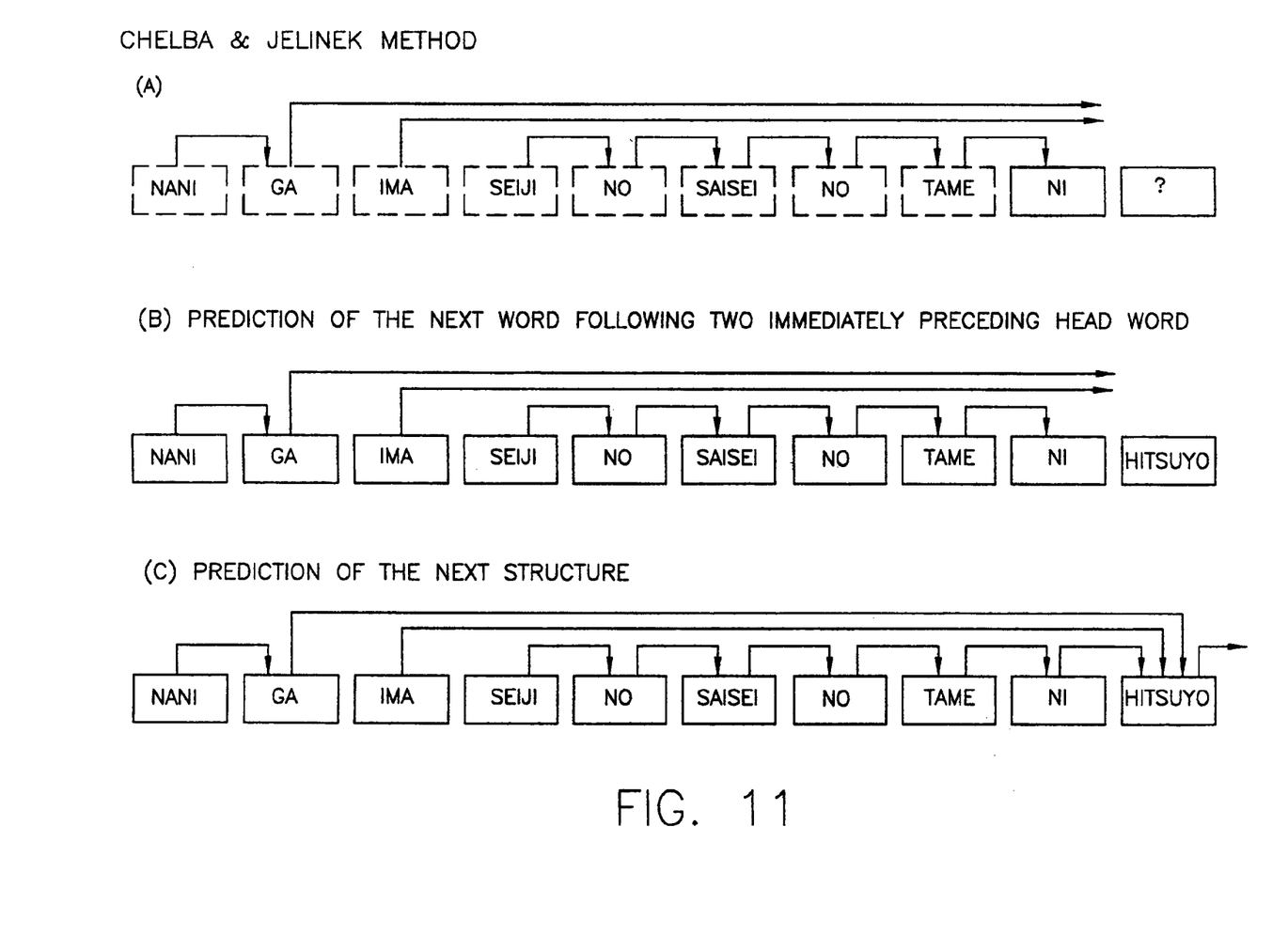
FIG. 11 is a diagram showing another example for explaining word prediction using the method proposed by Chelba and Jelinek.

For the phrase "nani-ga ima seiji-no saisei-no tame-ni", in FIG. 11, the following prediction process is performed. This phase is constituted by three partial analysis trees "nani-ga", "ima" and "seiji-no saisei-no tame-ni", and the head word of the trees are "ga", "ima" and "ni". As indicated by the solid line enclosures in FIG. 11A, the two immediately preceding head word are "ima" and "ni". Therefore, as is shown in FIG. 11B, "hitsuyo" is predicted by using "ima" and "ni". And after "hitsuyo" is predicted, the sentence structure that includes "hitsuyo" is predicted, as is shown in FIG. 11C.

To predict a word, the modifications performed by words provides useful information. However, that "nani-ga" is a modifier is not taken into account. As is described above, according to the method proposed by Chelba and Jelinek, no consideration is given for information that is useful for prediction that frequently occurs.

A need therefore exists for a word prediction method that supply improved prediction accuracy, and a speech recognition method therefor. The following will provide a brief summary of the invention.

SUMMARY OF THE INVENTION

The present invention focuses on the fact that, at each word prediction step, a sequence of partial analysis trees covering currently obtained word sequences can be employed as historical information. A partial analysis tree sequence, when used as historical information, can be employed to select a partial analysis tree carrying information that can more usefully be employed for the prediction of the next word. In essence, when a word sequence employed as history and a modification structure are used to select the most useful word and/or word sequence for predicting the next word, prediction accuracy can be improved. That is, after a partial analysis tree that includes a modification function for a word to be predicted is specified, this partial analysis tree, i.e., a word and/or a word sequence that is estimated to have a modification relationship with a word that is to be predicted, is employed for the prediction of the following word. Unlike the method proposed by Chelba and Jelinek, since the structure of a sentence, to include the word to be predicted, is employed, only information that is useful for prediction will be taken into account.

Based on the above described idea, according to the present invention, a speech recognition method is provided, said method comprising the steps of: specifying a structure of a phrase from a beginning of the phrase to a j-th word, wherein j=0, 1, 2, . . . ; employing a sentence structure up to said j-th word to specify one or multiple partial analysis trees modifying the (j+1)th word; predicting said (j+1)th word based on said one or multiple partial analysis trees; obtaining a putative sentence structure for the phrase including the predicted (j+1)th word and a probability value for said putative sentence structure; when the above steps have been performed up to the last word of said sentence, selecting as speech recognition results a sentence structure and a word sequence having maximum probability values; and returning said speech recognition results to a user.

According to the present invention, a speech recognition apparatus is provided, said apparatus comprising: an arrangement adapted to specify a structure of a phrase from a beginning of the phrase to a j-th word, wherein j=0, 1, 2, . . . ; an arrangement adapted to employ a sentence structure up to said j-th word to specify one or multiple partial analysis trees modifying the (j+1)th word; an arrangement adapted to predict said (j+1)th word based on said one or multiple partial analysis trees and obtaining a putative sentence structure for the phrase including the predicted (j+1)th word and a probability value for said putative sentence structure; an arrangement adapted to recognize, when the above steps have been performed up to the last word of said sentence, select as speech recognition results a sentence structure and a word sequence having maximum probability values; and an arrangement adapted to return said speech recognition results to a user.

The present invention also provides a program storage device readable by computer, tangibly embodying a program of instructions executable by the computer to perform method steps for speech recognition, said method comprising the steps of: specifying a structure of a phrase from a beginning of the phrase to a j-th word, wherein j=0, 1, 2, . . . ; employing a sentence structure up to said j-th word to specify one or multiple partial analysis trees modifying the (j+1)th word; predicting said (j+1)th word based on said one or multiple partial analysis trees; obtaining a putative sentence structure for the phrase including the predicted (j+1)th word and a probability value for said putative sentence structure; when the above steps have been performed up to the last word of said sentence, selecting as speech recognition results a sentence structure and a word sequence having maximum probability values; and returning said speech recognition results to a user.

For a better understanding of the present invention, together with other and further features and advantages thereof, reference is made to the following description, taken in conjunction with the accompanying drawings, and the scope of the invention that will be pointed out in the appended claims.

DETAILED DESCRIPTION OF THE PREFERRED EMBODIMENTS

The preferred embodiment of the present invention will now be described. It is to be understood that the present invention, in accordance with at least one presently preferred embodiment, includes method steps (e.g. speech recognition) that may be employed by elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

It will also be readily understood that the present invention, as generally described and illustrated in the Figures herein, may be arranged and designed in a wide variety of different configurations. Thus, the following more detailed description of the embodiments of the methods of the present invention, as represented in the Figures, is not intended to limit the scope of the invention, as claimed, but is merely representative of selected embodiments of the invention. Thus, although illustrative embodiments of the present invention have been described herein with reference to the accompanying Figures, it is to be understood that the invention is not limited to those precise embodiments, and that various other changes and modifications may be affected therein by one skilled in the art without departing from the scope or spirit of the invention.

Figure 1:
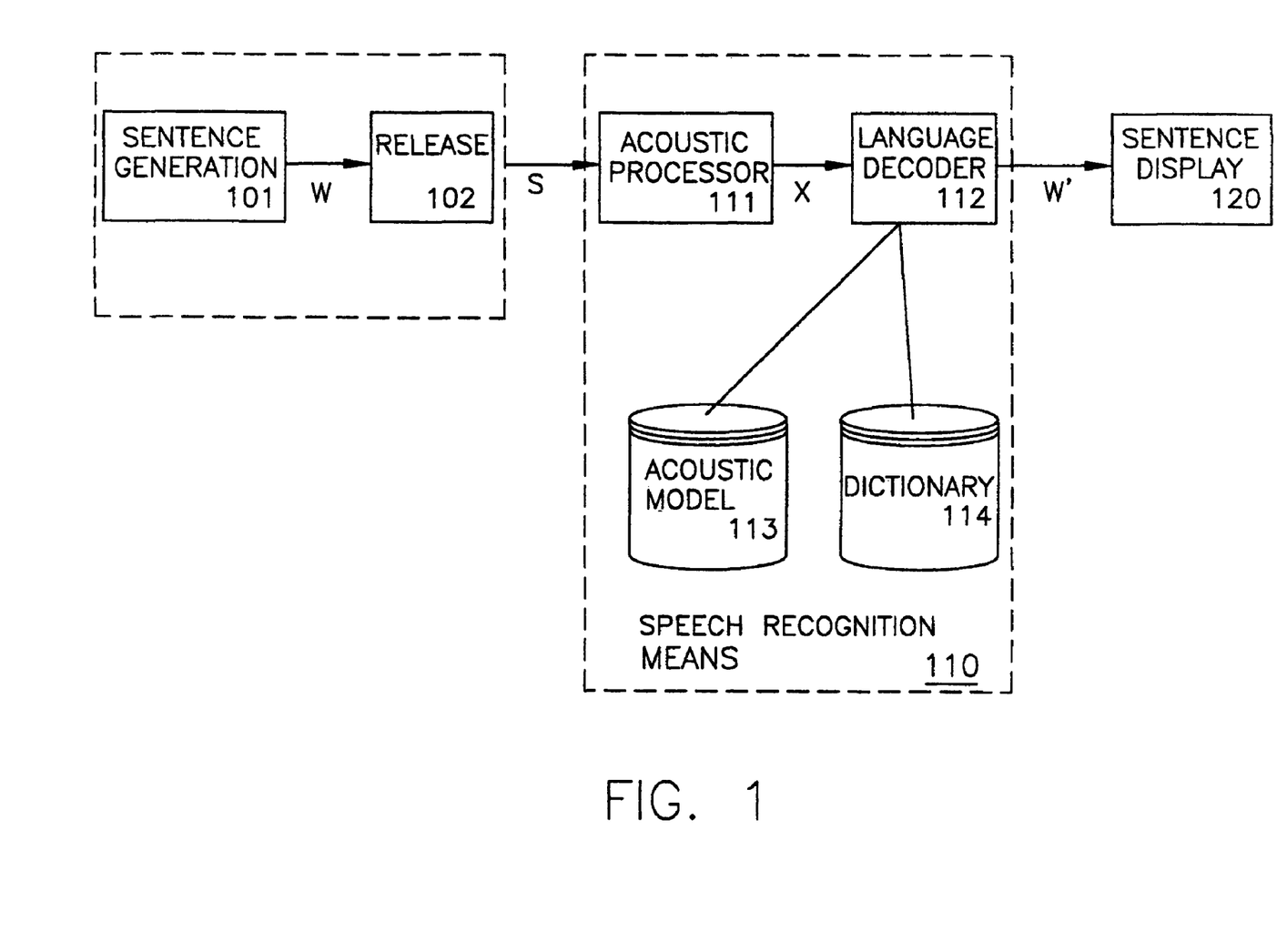
FIG. 1 is a block diagram for the embodiment.

FIG. 1 is a block diagram illustrating the configuration including a speech recognition apparatus, according to an embodiment. A word sequence W, generated as a sentence (a true sentence) by a block 101, is released as S (block 102). The released S is transmitted to an acoustic processor 111 constituting speech recognition means 110. The acoustic processor 111 converts the input S into a signal X, which it stores. The signal X is changed into a recognition result W' by a language decoder 112, which includes an acoustic model 113 that has learned the feature of a sound and a dictionary 114 in which text data prepared in advance through learning is stored. The sentence for the result W' is subsequently displayed (block 120).

Figure 2:
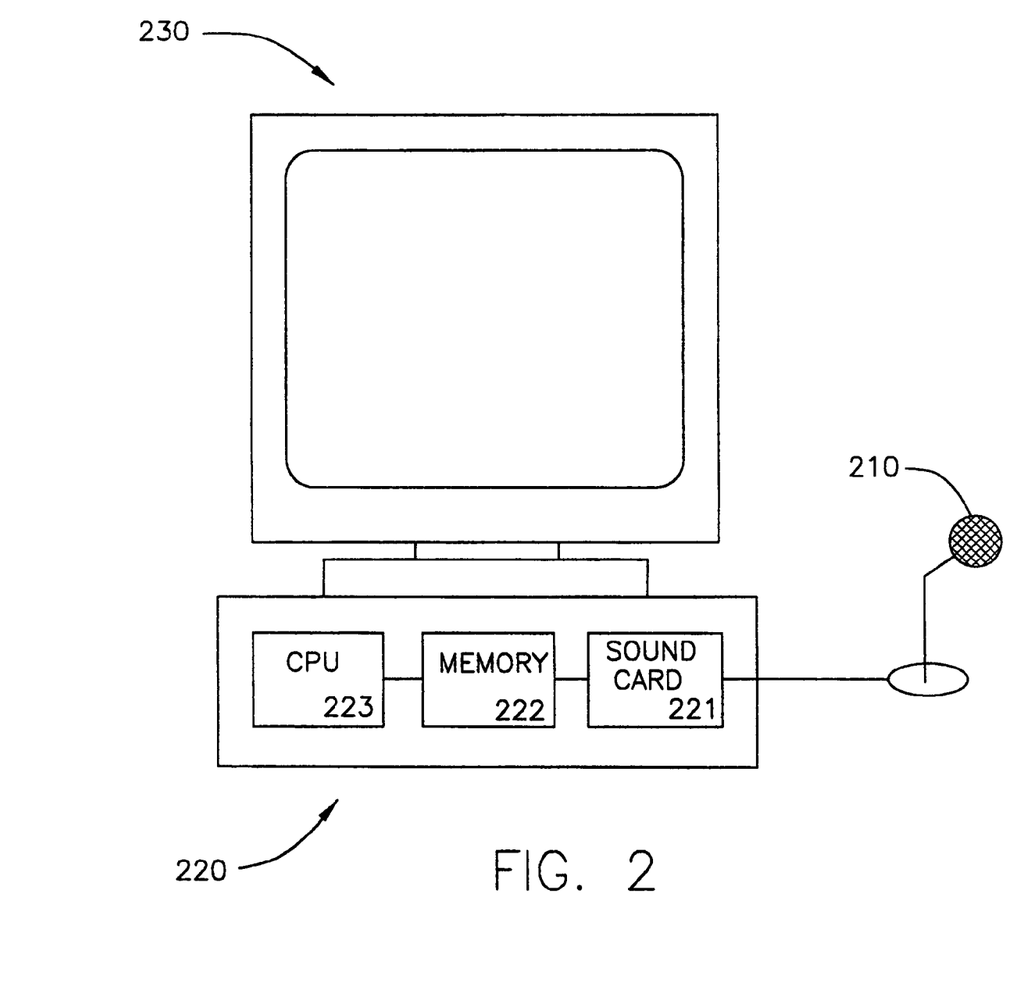
FIG. 2 is a diagram showing the configuration of a computer system according to the embodiment.

FIG. 2 is a diagram showing an example system for the employment of the speech recognition method according to one embodiment. This system comprises a microphone 210, a computer 220 and a display device 230. The computer 220 includes a sound card 221, a memory 222 and a CPU 223. In the system in FIG. 2, a speaker's speech is received as an analog signal by the microphone 210. Thereafter, the sound card 221 of the computer 220 converts the analog signal into a digital signal that is stored in the memory 222. The acoustic model 113 and the dictionary 114, including the language model, are also stored in the memory 222. Subsequently, the CPU 223 decodes the language based on the digital signal and the dictionary 114 stored in the memory 222, and also interprets and executes a program for implementing a word prediction method that will be described later. The obtained language is the recognition result, and is displayed on the display device 230. This program is stored in the memory 222.

In this system, the microphone 210 is a member separate from the computer 220, but it may be integrally formed with the computer 220 or the display device 230. In other words, so long as a microphone for converting speech into equivalent electrical energies is provided, any form can be employed. Furthermore, the recognition result is displayed on the display device 230, e.g., a CRT; however, but the result can also be transferred to and printed by a printer, or it can be stored on a flexible disk or another storage medium.

In one embodiment, as an assumption for the word prediction method that will be described below, proposed words are selected as the result of calculations that use the acoustic model 113 for the speech signal obtained by the acoustic processor 111. The following word prediction process is performed for these selected words, and the speech recognition results are finally obtained.

The word prediction method for use with the exemplary system will now be described. As is described above, according to the present invention it is proposed that a partial analysis tree that has a modification relationship with a word to be predicted is predicted, and then, the partial analysis tree, i.e., a preceding word and/or word sequence, it is estimated is related to the next word, is employed to predict the next word. In other words, the next word is predicted by using the partial analysis tree that has a modification relationship with the word to be predicted.

This embodiment will be explained based on the example phrase "sara-ni sho-senkyoku no", which was used for explaining the tri-gram method and the method proposed by Chelba and Jelinek. The phrase "sara-ni sho-senkyoku no" comprises the five words "sara-ni", "sho", "senkyo", "ku" and "no". Assuming "j" is used to represent the position of a word measured from the beginning of the phrase, "no" is the fifth word. Further, as shown in FIGS. 3A to 3C, it is assumed that there are three structure types for the phrase that includes the fifth word "no". The sentence structure in this case represents the modification relationship among the words. The three structures will now be described.

In FIG. 3A, while "sara-ni" does not modify "no", "no" is modified by "ku". This state is shown by using arrows; the arrow from "sara-ni" points to the word following "no", while the arrow from "ku" points to "no". Since "sara-ni" forms a partial analysis tree and "sho-senkyoku no" forms another partial analysis tree, in the example in FIG. 3A the only partial analysis tree related to "no" is "sho-senkyoku no". It should be noted that the probability value for this structure is defined as 0.034.

In FIG. 3B, neither "sara-ni" nor "ku" modify "no". Therefore, the arrows from "sara-ni" and "ku" point to words following "no". The probability value for this sentence structure is defined as 0.001.

In FIG. 3C, instead of the "no" in FIGS. 3A and 3B, the use of "wo", which has a similar sound, is predicted. The prediction of "wo" is instructed by the acoustic model 113. As for the sentence structure, as in FIG. 3A, while "sara-ni" does not modify "no", "ino" is modified by "ku". The probability value for the case in FIG. 3C is defined as 0.028. And since the probability value in FIG. 3A is the highest, at this time the case represented by FIG. 3A, which has the maximum probability value, can be the proposed result for speech recognition.

Figure 3:
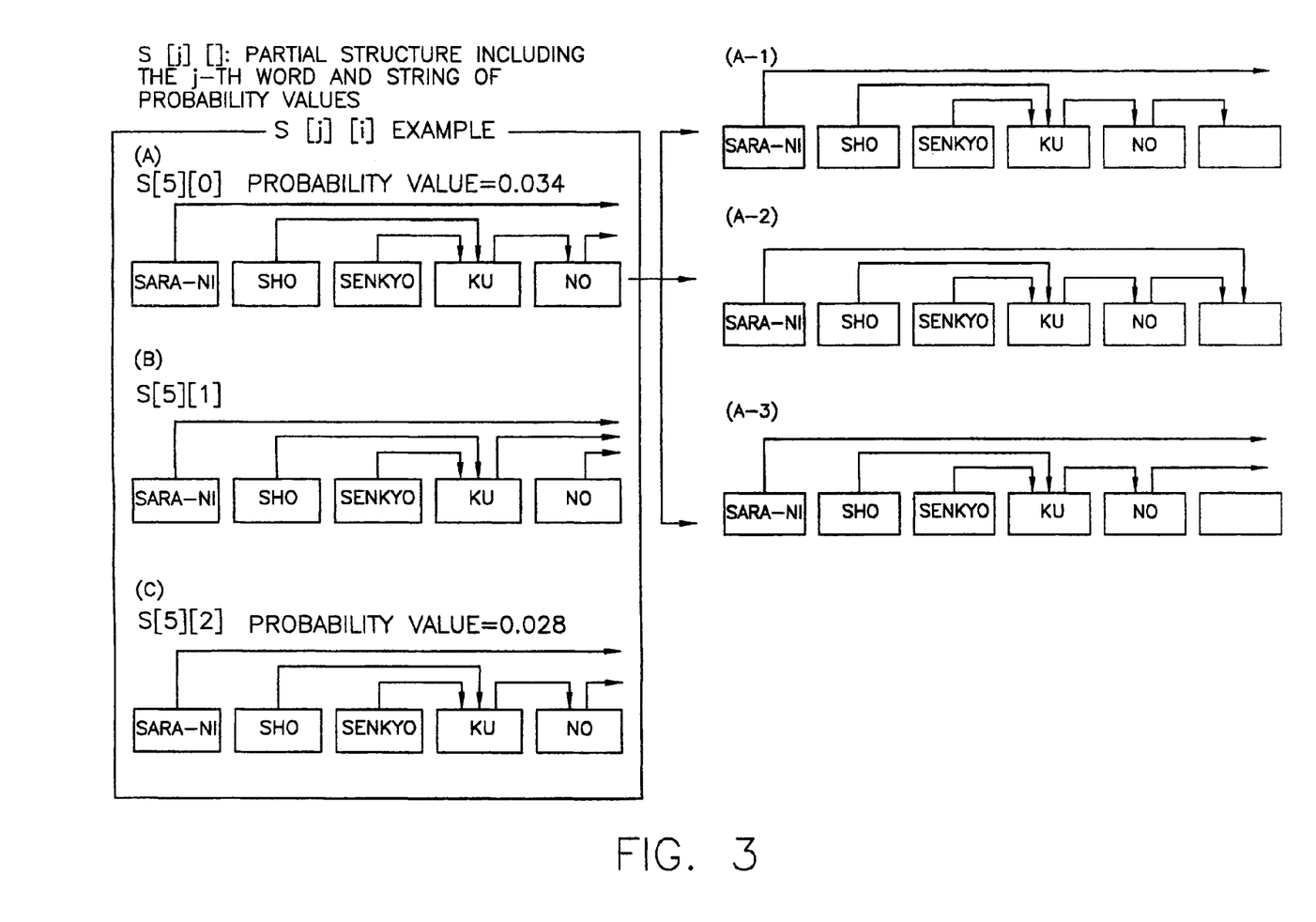
FIG. 3 is a diagram for explaining word prediction according to the embodiment.

The cases in FIGS. 3A to 3C are merely examples used for explaining an embodiment. For example, when the fifth word is "wo", the same case as in FIG. 3B may be present, or a case where the fifth word is "to" instead of "no" or "wo" may be present. In any case, in FIGS. 3A to 3C, the structure, including the j-th (fifth) word, and the probability value are shown. It should be noted that the statement s[5][0] in FIG. 3 indicates that the fifth word is a target to be processed, and [0] means one of the words having a modification relationship is a target for the process.

Then, the sixth word is predicted. For this prediction, first, the sentence structure, including the sixth word, is specified. For the example in FIG. 3A, there are three available cases: a case where only "no" modifies the sixth word; a case where both "sara-ni" and "no" modify the sixth word; and a case where "sara-ni" and "no" do not modify the sixth word. The sixth word is predicted for the respective three cases. These three cases are shown in FIGS. 3(a-1) through (a-3). In this embodiment, before the sixth word is predicted, the sentence structure, including the sixth word, is specified.

In the dictionary 114, the appearance frequency of a predetermined word relative to another predetermined word and/or word sequence is written based on text data that has been learned. For example, assuming that sentence "sho-senkyoku no" has appeared in the text data n times and has been followed by "donyu" m times, the frequency appearance for "donyu" relative to "sho-senkyoku no" is m/n. When two partial analysis trees of "sara-ni" and "sho-senkyoku no" are employed to predict "donyu", the frequency whereat "donyu" appears after "sara-ni" and "sho-senkyoku no" must be taken into account. That is, assuming that, in the text data, a sentence including "sara-ni" and "sho-senkyoku no" appeared n' times and thereafter the word "donyu" appeared m' times, the appearance probability for "donyu" relative to "sara-ni" and "sho-senkyoku no" is m'/n'. At this time, according to the empirical rule, very frequently "sara-ni" will modify a declinable word, such as a verb or an adjective, and will seldom modify an indeclinable word, such as a noun. Thus, since the appearance frequency m' of noun "donyu" is very small, the probability value when "donyu" is predicted by using two partial analysis trees "sara-ni" and "sho-senkyoku no" is considerably smaller than the probability value obtained when "donyu" is predicted merely by using "sho-senkyoku no". In other words, it is not preferable for "sara-ni" to be taken into account for the prediction of "donyu".

Therefore, when "no" is used to predict "donyu", the probability value for the phrase "sara-ni sho-senkyoku no donyu" is greater than the probability value for this sentence when "sara-ni" and "no" are employed to predict "donyu".

In this embodiment, FIGS. 3(a-1) and (a-2) have been explained, and the probability value is calculated in the same manner for the case in FIG. 3(a-3). Further, the prediction process is performed in the same manner, up to the last word of the sentence.

Figure 4:
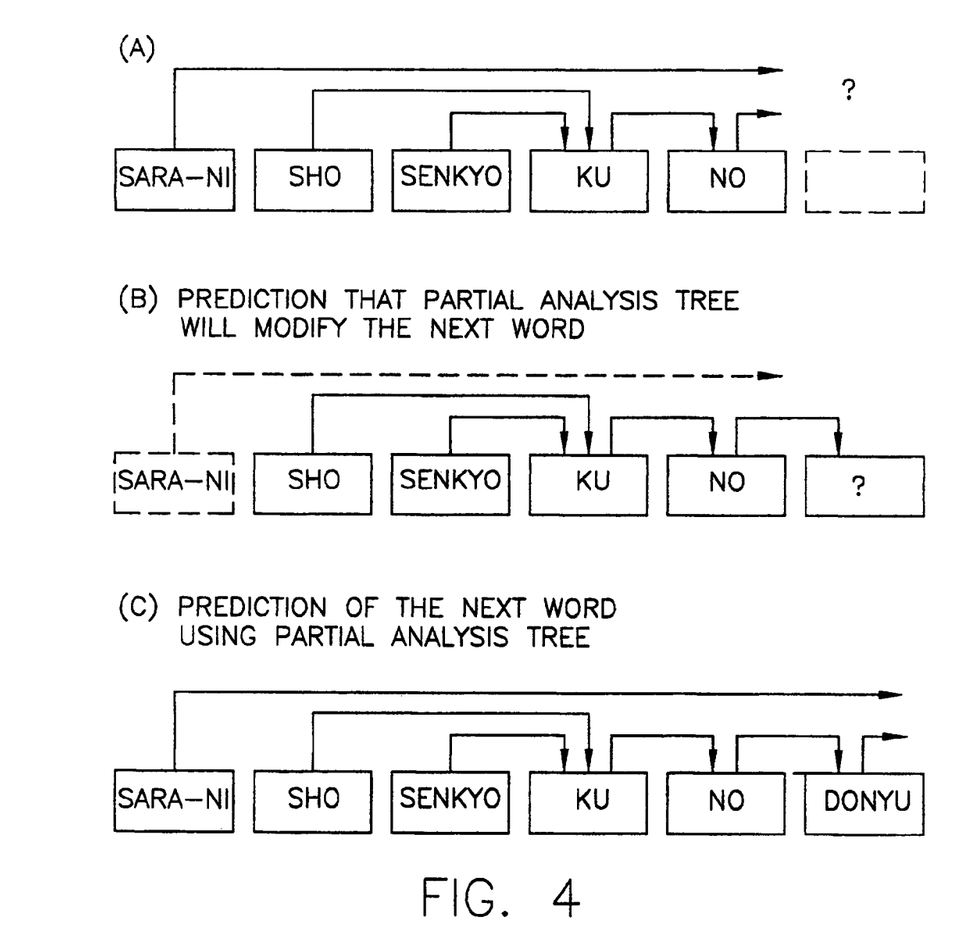
FIG. 4 is a diagram for explaining an example of word prediction according to the embodiment.

The word prediction processing for the case in FIG. 3(a-1) will now be described while referring to FIGS. 4A to 4C. In FIG. 4A, the state in FIG. 3(a-1) is shown. In this state, a partial analysis tree having a modification relationship with the next word "?" (the sixth word in this case) is specified. In this case, the partial analysis tree "sho-senkyoku no" modifies the sixth word, while the sixth word is not modified by the partial analysis tree "sara-ni". This modification is shown in FIG. 4B. That is, the arrow from "sara-ni" points to a word following the sixth word, and indicates that no modification has been established between the sixth word and "sara-ni". The arrow from "no" in "sho-senkyoku no" points to the sixth word "?", and indicates that the word sequence "sho-senkyoku no" modifies the sixth word.

As is described above, after the sentence structure, including the sixth word, has been predicted, "donyu" is predicted using the partial analysis tree "sho-senkyoku no", which has a modification relationship with the sixth word. Further, after the prediction of "donyu", as is shown in FIG. 4C, the sentence structure, to include "donyu", is predicted. In other words, according to the case in FIG. 3(a-1), since "sara-ni", which probably reduces the prediction accuracy, is not taken into account, a high probability value can be obtained.

The word prediction method for this embodiment has been explained. Next, the processing for finally outputting the speech recognition results will be explained while referring to the flowchart in FIG. 5. According to this processing, as previously described, proposed words are selected as the results of calculations using the acoustic model 113 for speech signal acquired by the acoustic processor 111, and the narrowing of the selected words is further performed by the prediction.

Figure 5:
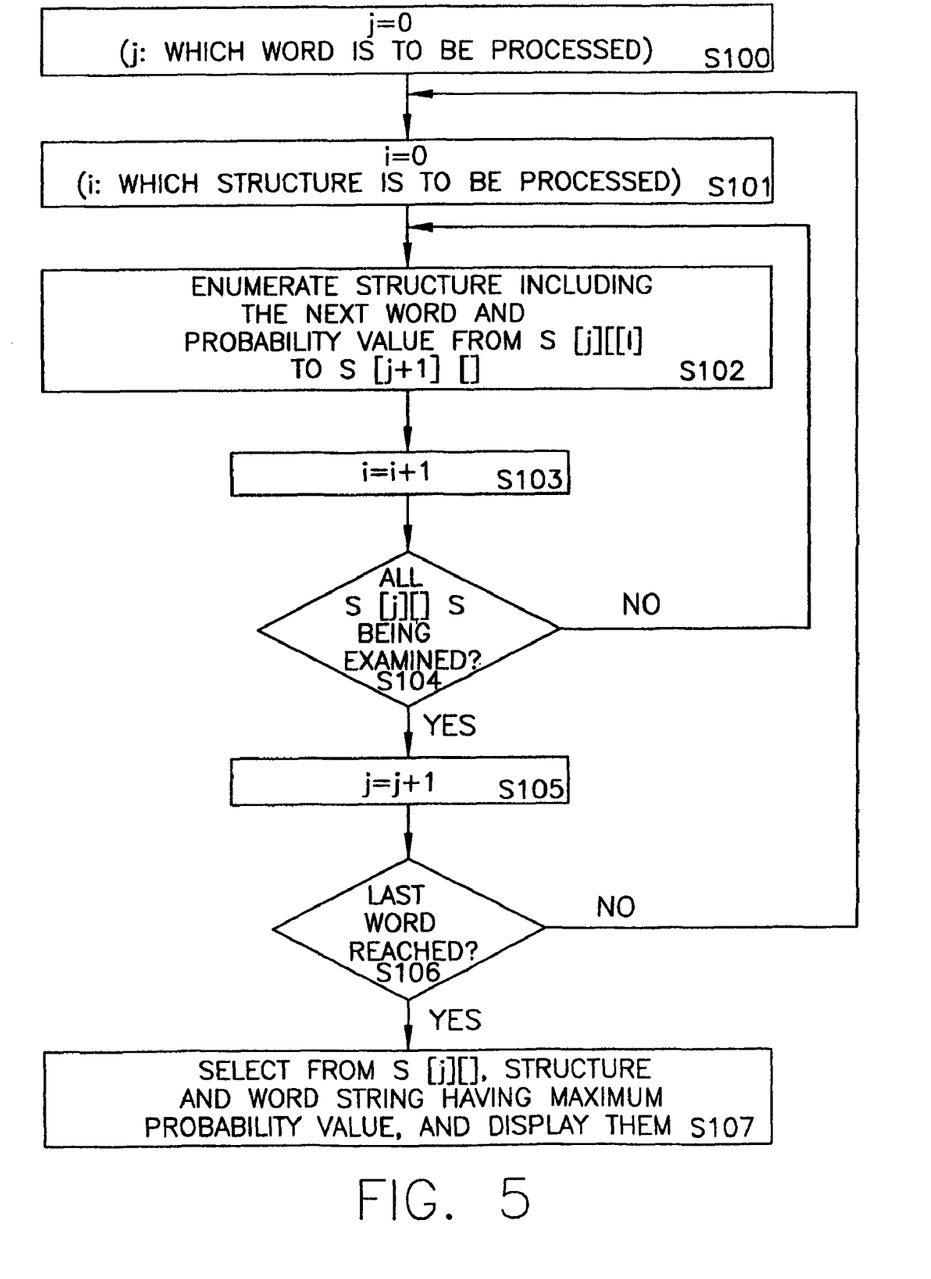
FIG. 5 is a flowchart for explaining speech recognition according to the embodiment.

In FIG. 5, which word is to be processed (S100) and which structure is to be processed (S101) are determined. The position of a word to be processed is represented by using "j", and a structure to be processed is represented by "i". Since the prediction is performed starting at the beginning of the sentence, the initial values of j and i are 0. The specific form of j and i can be easily understood by referring to FIG. 3.

Then, the structure of a sentence, including a word to be predicted, and its probability value are obtained (S102). In FIG. 5, s[j][ ] at S104 represents the sentence structure that includes the j-th word and the probability value. In the example in FIG. 3, first, s[5][0], i.e., the first sentence structure of the three, and its probability value are obtained for the fifth word. Since this sentence structure and the probability value are employed for the predication of the next word, these are enumerated relative to s[j+1][ ] (S102). In the example in FIG. 3, first, FIG. 3(a-1) is enumerated for s[6][ ].

When there are multiple sentence structures, the process at s102 is performed for all of them. To do this, the process at S103, where i=i+1, and the process at S104, for determining whether all s[j][ ] are examined, are performed.

When the process at S102 has been completed for all the structures, the same process is performed for the next word, which is defined as j=j+1 (S105). When j=j+1 is not the last word of the sentence, the process sequence from S101 is performed. When j=j+1 is the last word, the sentence structure and the word sequence having the maximum probability value are selected from s[j][ ], and are displayed on the display device 230. This sentence structure can be displayed by using arrows to indicate modifications, or as a partial analysis tree structure.

In the above embodiment, the present invention is carried out on a personal computer. However, the present invention can be provided as a storage medium in which a predetermined program is stored, or a transmission apparatus for transmitting a program.

The present invention will now be described based on an example phrase "nani-ga ima seiji-no saisei-no tame-ni". The phrase "nani-ga ima seiji-no saisei-no tame-ni" consists of nine words, "nani", "ga", "ima", "seiji", "no", "saisei", "no", "tame" and "ni", and is constituted by three partial analysis trees "nani-ga", "ima" and "seiji-no saisei-no tame-ni".

Figure 6:
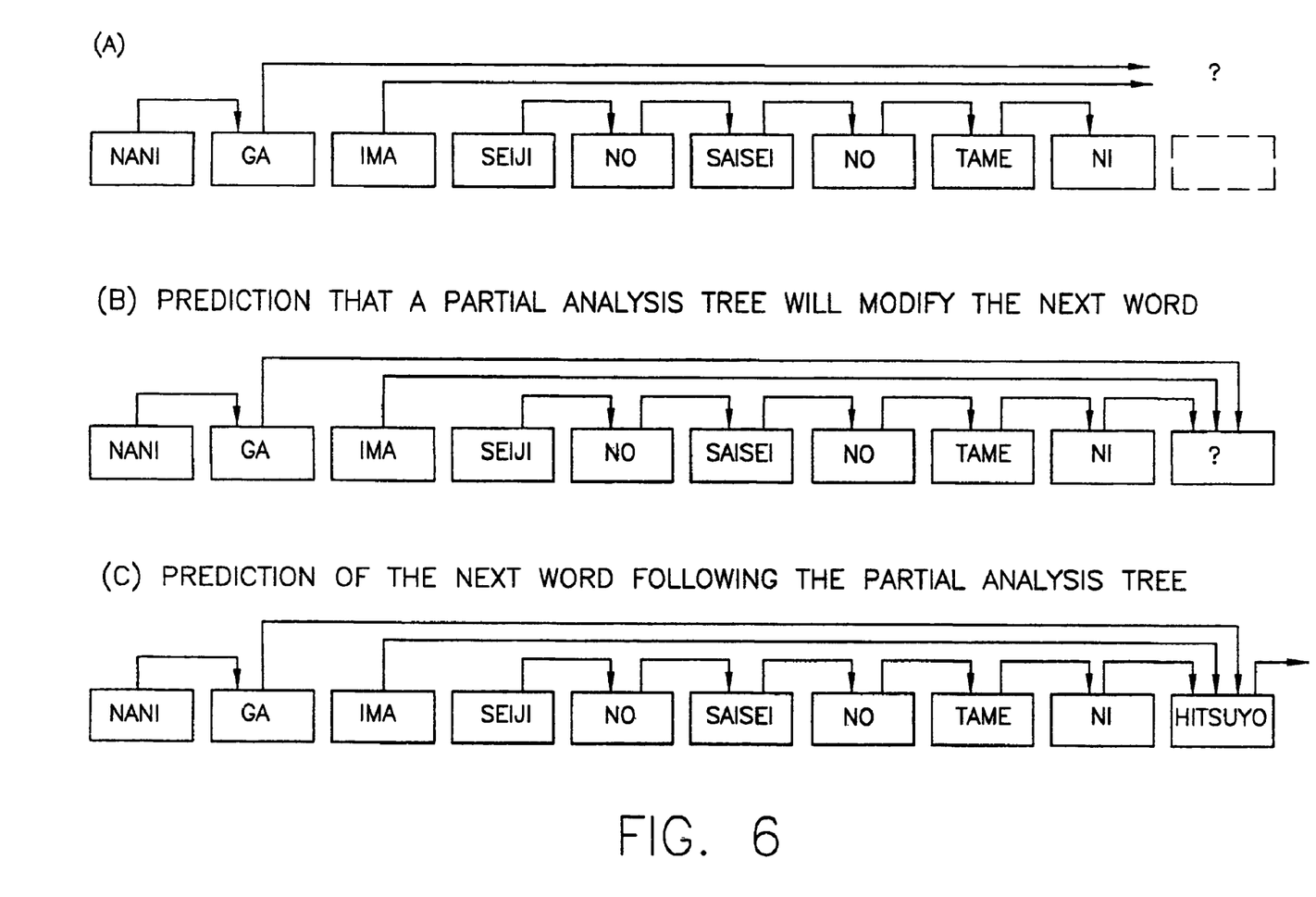
FIG. 6 is a diagram showing another example for explaining word prediction according to the embodiment.

In the state in FIG. 6A, the word prediction up to "nani-ga ima seiji-no saisei-no tame-ni" is completed. As is described above, this phrase is formed of three partial analysis trees, "nani-ga", "ima" and "seiji-no saisei-no tame-ni". As for the partial analysis tree "nani-ga", it has been predicted that "nani" modifies "ga". In other words, the word modified by the partial analysis tree "nani-ga" is unknown. This state is understood because the arrow from "ga" in FIG. 6A points to "?". Further, the words modified by the partial analysis trees "ima" and "seiji-no saisei-no tame-ni" are also unknown.

Based on the state in FIG. 6A, the partial analysis tree that modifies the next word (the tenth word in this example) is predicted. In this example phrase, it is predicted or specified that all of the three partial analysis trees, "nani-ga", "ima" and "seiji-no saisei-no tame-ni", modify the tenth word. This modification is shown in FIG. 6B. That is, the arrows from "ga" in "nani-ga", "ima", and "ni" in "seiji-no saisei-no tame-ni" point to the tenth word.

As is described above, when the sentence structure, to include the tenth word, has been specified, the tenth word is predicted. That is, since all three partial analysis trees ("nani-ga", "ima" and "seiji-no saisei-no tame-ni") modify the word to be predicted, all of these are considered to predict "hitsuyo".

According to the method proposed by Chelba and Jelinek, "hitsuyo" is predicted using "tame" and "ni", while in this embodiment "nani-ga", which is useful information for predicting "hitsuyo", is also employed, the prediction accuracy in this embodiment is higher.

Up to now, Japanese phrases have been employed as examples. An explanation will now be given using an English phrase. One of differences between Japanese and English is that the direction of the modification in Japanese is constant, whereas it is not in English. When this embodiment is used for a language, such as English, where the direction of modification is not constant, only a partial analysis tree having a modification relationship with the next word and the direction of the modification need be specified, and the partial analysis tree having the modification relationship need only be employed to predict the next word.

Assume as an example that "after" is predicted from "the contact ended with a loss". The phrase "the contact ended with a loss" consists of six words, "the", "contact", "ended", "with", "a" and "loss". Further, "the contact" forms one partial analysis tree, and "ended with a loss" forms another partial analysis tree.

Figure 7:
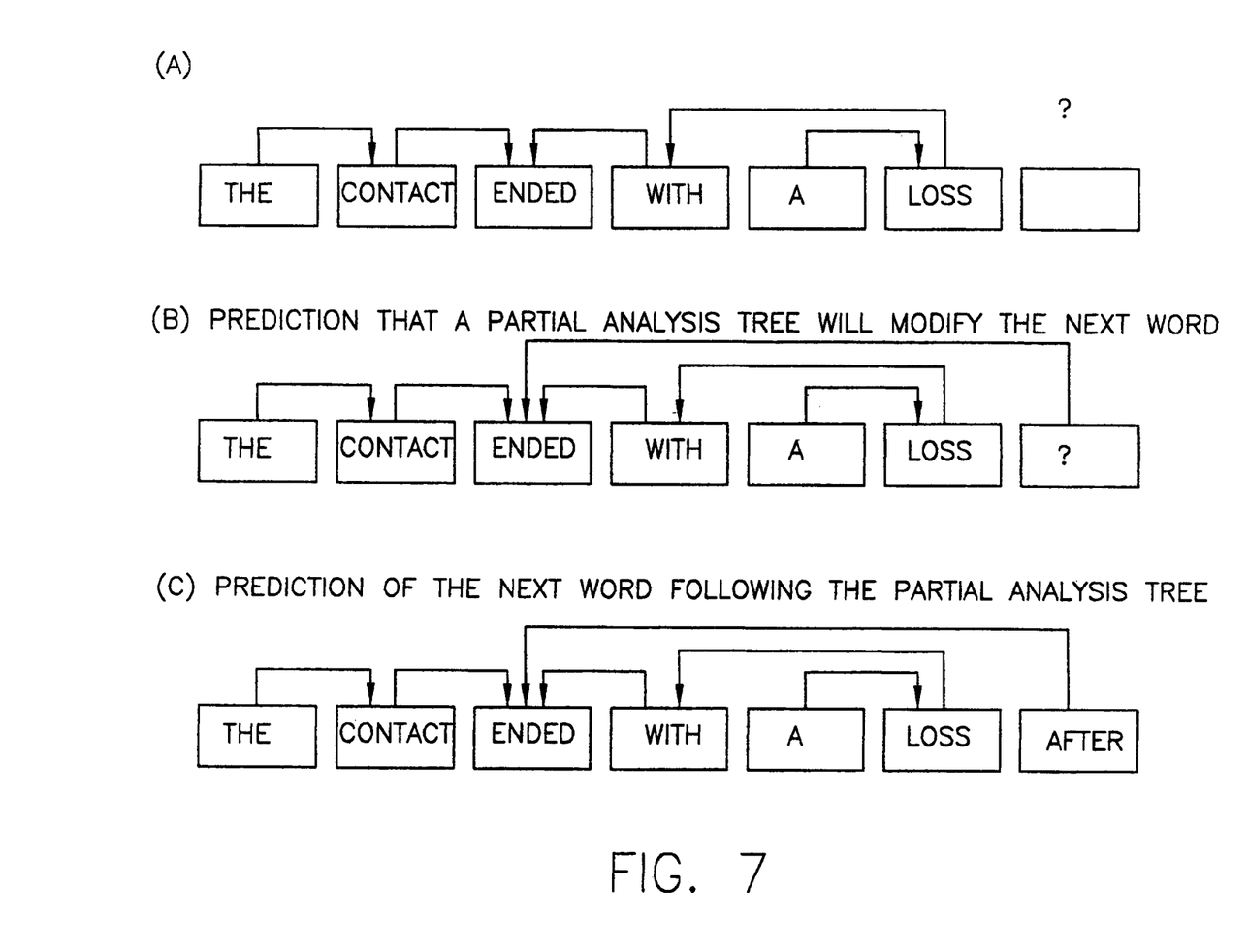
FIG. 7 is a diagram showing an additional example for explaining word prediction according to the embodiment.

FIG. 7A is a diagram showing the state wherein the prediction of words up to "the contact ended with a loss" is completed. As is described above, this phrase consists of two partial analysis trees "the contact" and "ended with a loss". As indicated by arrows in FIG. 7A, "the" in the partial analysis tree "the contact" modifies "contact". In the partial analysis tree "ended with a loss", "a" modifies "loss", "loss" modifies "with" and "with" modifies "ended". As is described above, the modification in English has two directions: from front to rear and from rear to front.

Based on the state in FIG. 7A, the partial analysis tree related to the next word "?" (the seventh word in this case) is predicted. In other words, it is predicted that, as is shown in FIG. 7B, the seventh word modifies "ended". Since "ended" is included in the partial analysis tree "ended with a loss", the seventh word is predicted based on the modification relationship with "ended with a loss". Then, as is shown in FIG. 7C, "after" is predicted from the partial analysis tree "ended with a loss".

Example Experiment

A model consisting of approximately 1000 sentences was prepared based on a newspaper article. An experiment for obtaining an entropy was conducted for this model using the method of this embodiment. The following results were obtained.

This Embodiment: 4.05 [bit]
tri-gram: 4.27 [bit]

The value of 4.05 [bit] in this embodiment corresponds to a selection for which 16.6 words were used, and the value of 4.27 [bit] corresponds to a selection for which 19.3 words were used. Therefore, it was confirmed that the word prediction accuracy was improved when this embodiment was used.

As is described above, according to the present invention, the sentence structure, to include a word to be predicted, is specified, and the prediction of the word is performed using a word or a word sequence having a modification relationship with the word to be predicted. Since the modification relationship is useful information for the word prediction, the word prediction accuracy is increased.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A speech recognition method, said method comprising acts of:
   A) receiving a spoken phrase;
   B) applying an acoustic model to the phrase to select proposed words for the phrase;
   C) determining a structure of the phrase from a beginning of the phrase to a j-th word, wherein j is a positive integer;
   D) based at least in part on the determined structure of the phrase up to said j-th word, identifying one or multiple partial analysis trees modifying the (j+1)th word;
   E) predicting said (j+1)th word from the proposed words based on said one or multiple partial analysis trees;
   F) obtaining a putative sentence structure for the phrase including the predicted (j+1)th word and a probability value for said putative sentence structure;
   G) increasing j;
   H) while the j-th word is not a last word of the phrase, repeating steps C-G;
   I) selecting as speech recognition results for the phrase a sentence structure and a word sequence obtained in steps C-H having maximum probability values; and
   J) returning said speech recognition results to a user.

2. The method according to claim 1, wherein the act E further comprises:
predicting said (j+1)th word based solely on said one or multiple partial analysis trees having a modification relationship with said (j+1)th word.

3. The method according to claim 1 wherein, when multiple partial analysis trees modifying the (j+1)th word are specified, the act E is performed based on said specified multiple partial analysis trees modifying the (j+1)th word.

4. The method according to claim 1 further comprising:
when a modification direction between said one or multiple partial analysis trees modifying the (j+1)th word and said (j+1)th word is not constant, specifying said modification direction.

5. The method according to claim 1 wherein when multiple modifications are established between said one or multiple partial analysis trees modifying the (j+1)th word and said (j+1)th word, predicting a different (j+1)th word for each of said modifications.

6. The method according to claim 1 further comprising:
utilizing a dictionary database, containing appearance frequencies of a predetermined word relative to another predetermined word and/or word sequence obtained from text data that has been learned, to determine which of multiple partial analysis trees are to be utilized for predicting said (j+1)th word.

7. The method according to claim 1, wherein the act J further comprises:
displaying said speech recognition results on a display device.

8. The method according to claim 1, wherein the act J further comprises:
storing said speech recognition results in an external storage medium.

9. The method according to claim 1, wherein the act J further comprises:
transferring said speech recognition results to a printer; and printing said speech recognition results.

10. The method according to claim 1, wherein:
the act D comprises identifying one or more partial analysis trees from the determined structure of the phrase up to the j-th word, and determining which of the one or more partial analysis trees modify the (j+1)th word; and
the act E comprises predicting the (j+1)th word based only on those of the one or more partial analysis trees that are determined to modify the (j+1)th word.

11. A speech recognition apparatus comprising:
an arrangement of hardware and software adapted to receive a spoken phrase;
an arrangement of hardware and software adapted to apply an acoustic model to the phrase to select proposed words for the phrase;
a prediction arrangement of hardware and software adapted to perform acts of:
A) determining a structure of the phrase from a beginning of the phrase to a j-th word, wherein j is a positive integer;
B) based at least in part on the determined structure of the phrase up to said j-th word, identifying one or multiple partial analysis trees modifying the (j+1)th word;
C) predicting said (j+1)th word from the proposed words based on said one or multiple partial analysis trees;
D) obtaining a putative sentence structure for the phrase including the predicted (j+1)th word and a probability value for said putative sentence structure;

E) increasing j; and
F) while the j-th word is not a last word of the phrase, repeating steps A-E;
an arrangement of hardware and software adapted to select as speech recognition results for the phrase a sentence structure and a word sequence obtained in steps A-F having maximum probability values; and
an arrangement of hardware and software adapted to return said speech recognition results to a user.

12. The apparatus according to claim 11 wherein said prediction arrangement is adapted to predict said (j+1)th word based solely on said one or multiple partial analysis trees having a modification relationship with said (j+1)th word.

13. The apparatus according to claim 11 wherein said prediction arrangement is adapted to, when multiple partial analysis trees modifying the (j+1)th word are specified, predict said (j+1)th word based on said specified multiple partial analysis trees modifying the (j+1)th word.

14. The apparatus according to claim 11 wherein said prediction arrangement is adapted to, when a modification direction between said one or multiple partial analysis trees modifying the (j+1)th word and said (j+1)th word is not constant, specify said modification direction.

15. The apparatus according to claim 11 wherein said prediction arrangement is adapted to, when multiple modifications are established between said one or multiple partial analysis trees modifying the (j+1)th word and said (j+1)th word, predict a different (j+1)th word for each of said modifications.

16. The apparatus according to claim 11 wherein said prediction arrangement is adapted to utilize a dictionary database, containing appearance frequencies of a predetermined word relative to another predetermined word and/or word sequence obtained from text data that has been learned, to determine which of multiple partial analysis trees are to be utilized for predicting said (j+1)th word.

17. The apparatus according to claim 11, further comprising:
a display device which displays said speech recognition results.

18. The apparatus according to claim 11 further comprising:
a storage medium which stores said speech recognition results.

19. The apparatus according to claim 11 further comprising:
a printer which prints said speech recognition results.

20. The apparatus according to claim 11, wherein:
the act B comprises identifying one or more partial analysis trees from the determined structure of the phrase up to the j-th word, and determining which of the one or more partial analysis trees modify the (j+1)th word; and
the act C comprises predicting the (j+1)th word based only on those of the one or more partial analysis trees that are determined to modify the (j+1)th word.

21. A program storage device readable by computer, tangibly embodying a program of instructions executable by the computer to perform a method for speech recognition, said method comprising acts of:
A) receiving a spoken phrase;
B) applying an acoustic model to the phrase to select proposed words for the phrase;

C) determining a structure of the phrase from a beginning of the phrase to a j-th word, wherein j is a positive integer;

D) based at least in part on the determined structure of the phrase up to said j-th word, identifying one or multiple partial analysis trees modifying the (j+1)th word;

E) predicting said (j+1)th word from the proposed words based on said one or multiple partial analysis trees;

F) obtaining a putative sentence structure for the phrase including the predicted (j+1)th word and a probability value for said putative sentence structure;

G) increasing j;

H) while the j-th word is not a last word of the phrase, repeating steps C-G;

I) selecting as speech recognition results for the phrase a sentence structure and a word sequence obtained in steps C-H having maximum probability values; and J) returning said speech recognition results to a user.

22. The program storage device according to claim 21, wherein:

the act D comprises identifying one or more partial analysis trees from the determined structure of the phrase up to the j-th word, and determining which of the one or more partial analysis trees modify the (j+1)th word; and the act E comprises predicting the (j+1)th word based only on those of the one or more partial analysis trees that are determined to modify the (j+1)th word.

* * * * *